United States Patent Office 3,838,014
Patented Sept. 24, 1974

3,838,014
COMBINATION COLUMN REBOILER HEAT INPUT, OCTANE, OVERHEAD AND BOTTOMS CONTROL APPARATUS
Walter A. Bajek, Lombard, and James H. McLaughlin, La Grange, Ill., assignors to Universal Oil Products Company, Des Plaines, Ill.
Filed July 18, 1972, Ser. No. 272,916
Int. Cl. B01d 3/42
U.S. Cl. 196—132                    18 Claims

ABSTRACT OF THE DISCLOSURE

A process for the maximization of a gasoline bottoms stream from a stabilizer column. The control utilized is a combination of an on-stream octane monitor and bottoms and overhead flow rate limiting means which operate in combination to vary a set point temperature on a reboiler heat input control means. The control system is applicable to hydrocarbon processes and in particular to gasoline stabilization.

BACKGROUND OF THE INVENTION

Field of the Invention

The field of art to which this invention pertains is fractionation column control methods. More particularly, this invention relates to a combination process control means in which an on-stream octane monitor is operated in combination with overhead and bottoms flow rate limiting means to reset a heat input control means for the reboiler section of the fractionation column.

Description of the Prior Art

There is much prior art relating to stabilizer column control methods based on the octane of the gasoline bottoms stream from said column. In particular, the bottoms gasoline stream octane value is monitored and the heat input to the reboiler section can be varied in accordance with the octane value measured.

Our invention relates to a combination process which utilizes an on-stream octane monitor to effectively measure the octane number of a bottoms stream leaving a stabilizer column and to change the heat input to the reboiler section of the stabilizer column according to the octane number of the bottoms stream with an override function modifying the heat input to the reboiler section when there is an excess quantity of overhead or bottoms material produced. Basically, our invention incorporates the combination of measuring the overhead and bottoms flow rate and a bottoms octane number simultaneously, and at the same time that the measurements are made, varying the set point for the reboiler heat input means in accordance with both of these output signals. Our invention eliminates the problem associated with dumping the entire column via an excess of overhead or bottoms make while maximizing the bottoms octane value within a certain predetermined range.

SUMMARY OF THE INVENTION

Our invention can be summarized as a combination control process involving an octane monitor which monitors the bottoms octane from a column and overhead and bottoms flow rate measuring devices which measure the overhead and bottoms flow rates from the column. Both measuring means are limited by flow rate and octane limiting means which change the signals from the octane monitor or the flow measuring devices in accordance with maximum and minimum octane limits on the bottoms stream and a maximum flow rate on the overhead and bottoms streams.

A broad embodiment of our invention resides in combination with a continuous flow fractional distillation column, the feed to which is a gasoline fraction, the overhead from which comprises the lower boiling components of said fraction and the bottoms from which comprises the higher boiling components of said fraction said column including a reboiler section having a vapor outlet connecting with the lower portion of the column and means to supply heat to said reboiler from an external heat source, a control system for said column comprising: (a) means operatively associated with said heat supply means to vary the heat input to said reboiler in response to an adjustable set point value; (b) a hydrocarbon anlyzer comprising a stabilized cool flame generator with a servo-positioned flame front continuously receiving a sample of said column bottoms and developing a bottoms octane number signal which provides a measure of sample octane number of said bottoms stream; (c) a volumetric-octane control means operatively associated with said control means to vary said adjustable set point value to maintain a generally constant product of bottoms octane number times the bottoms flow rate; (d) means transmitting said bottoms octane signal to an octane limiting means which limiting means is operatively associated with said volumetric-octane control means which limiting means causes said volume octane control means to change said set point value when said octane is below a minimum value and when said bottoms octane is above a maximum value; (e) flow measurement means operatively associated with said overhead and bottoms streams to measure the rate of flow of said overhead and bottoms and produce overhead and bottoms flow rate output signals; (f) means transmitting said bottoms and overhead flow rate signals to a flow rate limiting means which means is operatively associated with said volumetric-octane control means; (g) said flow rate limiting means causes said volumetric-octane control means to change said set point value when said bottoms flow rate is greater than a bottoms maximum flow rate and causes said volumetric-octane control means to change said set point value when said overhead flow rate is above a certain maximum value.

DETAILED DESCRIPTION OF THE DRAWING

The invention will be more clearly understood by reference to the accompanying drawings in which.

Figure 1:
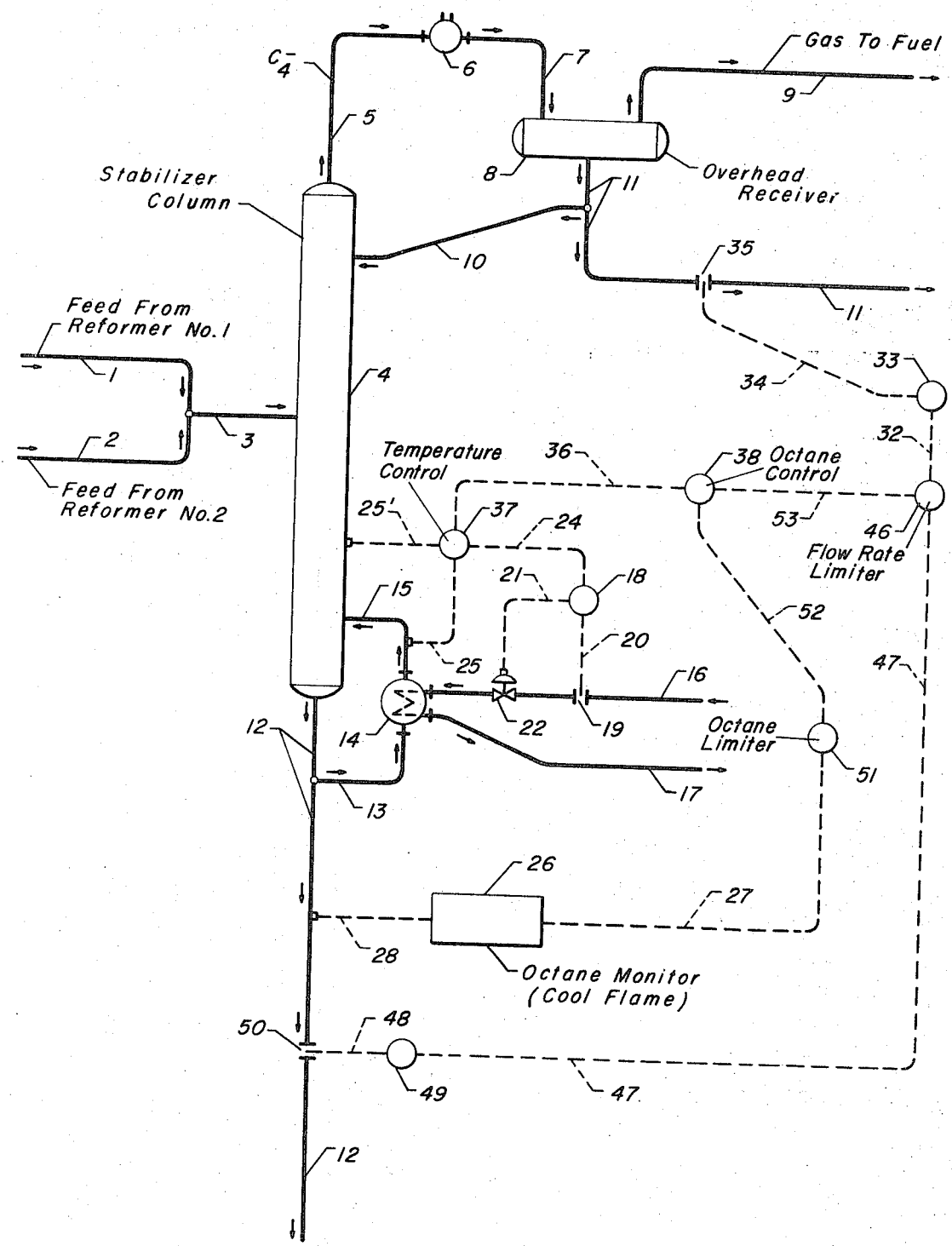
FIG. 1 illustrates a stabilizer column together with one mode of controlling the heat input thereto.

With reference now to FIG. 1, there is shown a stabilizer column 4 receiving a plurality of unstabilized gasoline feeds. Stabilizer column 4 is a conventional continuous flow externally refluxed fractional distillation column containing from 10 to 50 or more vertically spaced vapor-liquid contacting stages as, for example, bubble decks, sieve decks, perforated trays or the like. Line 1 carries unstabilized reformate from naphtha reforming unit No. 1. Line 2 carries unstabilized reformate from naphtha reforming unit No. 2. The combined reformates are charged to the column via line 3 which connects with the column at a locus approximately midway in the height thereof.

The two reforming units are separate, independently operated catalytic naphtha reforming units; the details thereof form no part of the present invention, being conventional and well known in the art. A typical catalytic naphtha hydroreforming unit is described in U.S. Pat. 3,296,118 (Class 208–100) to which reference may be had for specific information concerning flow arrangement, catalyst, conditions, etc. The feed to column 4 is generally under reactor products separator level control rather than direct flow control. Accordingly, the feed rate is usually but not always relatively constant, and may be subject to some variation due to changes in catalyst and/or operating conditions in either or both of the catalytic reforming units.

The overhead material from column 4, typically comprising predominantly $C_4$ and lighter hydrocarbons, together with some hydrogen and inert gas is removed via line 5, condensed in overhead condenser 6, and passed via line 7 to overhead receiver 8. Non-condensibles are removed through line 9. Overhead condensate, comprising essentially butanes with some propane, is taken off from receiver 8, a portion thereof being returned through line 10 as a reflux to column 4 and the remainder being sent via line 11 to storage. Conventional instrumentation, not here illustrated, will be provided to control column pressure, overhead receiver liquid level and reflux rate. On line 11 there is located a flow measurement device 35 which measures the rate of flow of material passing through line 11 out of the process. Flow measuring device 35 is connected via line 34 with a flow transmitter 33 which produces an overhead flow rate output signal which passes via line 32 to a flow rate limiting means 46. Flow measuring device 35 and transmitting means 33 comprise what is referred to in this specification and claims as the overhead flow measurement means. The flow measuring device may be either an orifice or a turbine or any other apparatus which can suitably be used to accurately measure flow rates of liquid material passing through line 11.

Stabilized gasoline product typically the heavier boiling material of the material passing into column 4 is removed from the bottom of column 4 via line 12 and passed to storage or other processing. Located on line 12 is flow measuring device 50 which is connected to flow transmitter means 49 via line 48. Flow transmitter 49 produces a bottoms flow rate output signal which passes via line 47 to the flow rate limiting means 46. The combination of the flow measuring device 50 and the flow transmitter 49 comprise what is referred to in the specification and the claims as bottoms flow measurement means. As described for the overhead flow measurement means system, the flow measuring device may be any one of selected devices which can accurately measure flow of the bottom stream.

Dashed line 28 represents a suitable sampling system to provide an intermittent or continuous sample of column bottoms to the octane monitor. For example, a sampling system may comprise a sample loop taking bottoms at a rate of 100 cc. per minute from line 12 with eventual return to the bottoms line. The sample actually used is drawn off from an intermediate portion of the sample loop and injected at a controlled rate by metering pump to the combustion tube of the octane monitor.

The octane monitor output signal which represents the bottoms stream octane number is being measured at substantially the same time the signals produce is passed via line 27 to the octane limiting means 51.

Octane limiting means 51 is connected via line 52 to the volumetric-octane control means 38. The function of octane limiting means 51 is to inject in the control system a method of bringing the octane number of the bottoms back to a given predetermined maximum or minimum value should the control loop cause the bottoms octane stream to vary significantly from the desired range. Specifically, the octane limiting means should have maximum and minimum octane number values so that when the octane number of the bottoms stream is below a certain preset value the octane limiting means can send a signal to the volumetric-octane control means 38 to modify its output signal which passes via line 36 and resets the set point value for the heat control means thereby bringing the octane up to a value above the minimum octane number value. Similarly, when the octane of the bottom stream is above a preset maximum octane value the octane limiting means can also produce a signal which will cause the volumetric-octane control means to modify the set point temperature for the reboiler heat control means. It is preferred that octane limiting means 51 operate in a manner so that when the octane reading taken from line 12 is within the permissible range of octane numbers desired the signal which passes to the octane limiting means via line 27 and through it and to the volume octane control means via line 52 is not altered. In other words, when the octane number of the bottoms stream is within the permissible range of octane values, the output signal from the octane monitor can pass directly to the volumetric-octane control means 38 via lines 27 and 52 without being substantially modified by the octane limiting means. In instances in which the octane monitor senses an octane value of the bottoms stream which is above or below the range of octanes desired for good operations the octane limiting means can override the octane monitor signal passing to the volume octane control means. The signal can independently be passed to the volumetric-octane control means via a different circuit or the octane limiting means can suppress the octane monitor output signal and substitute in its place a compensating signal which will in some ways adjust the volumetric-octane control means to cause it to bring the temperatures in the reboiler system up or down to bring the octane number of the bottoms stream within the specification range desired.

Flow rate limiting means 46 operates very similarly to the octane limiting means 51. Specifically, the signals received from the flow measurement means on the overhead and bottoms streams pass via lines 32 and 47 respectively to the flow rate limiting means. Flow rate limiting means 46 senses both the signals passed to it, and in instances in which both the overhead output flow rate and the bottoms output flow rate are below preset maximum values, the signal which is passed out of the flow rate limiting means via line 53 to the volumetric-octane control means 38 will be essentially the flow rate signal from the bottoms flow measuring means. The volumetric-octane control means 38 may itself contain a preset set point value which can be changed depending on the operations desired, or products desired from the column. Specifically, the volume octane control means changes the set point to temperature control means 37 to maintain an essentially constant value of the bottoms flow rate times the bottoms octane number. Essentially, when the value of the product of the bottoms octane number and its flow rate is within values desired for operations, the column is essentially on automatic control and temperature control means 37 is allowed to vary the temperature of the column as long as the volume octane control means does not change its set point value. When operating at constant conditions, there will be an essentially constant value of the volume of bottoms produced times its octane number giving an essentially easy-to-use number of barrel-octane which is being produced by the column. Should there be slight variances either in the bottoms flow rate or in the octane number of the bottoms, the volumetric-octane control means senses its variance from its preset set point and causes a signal to be passed to temperature control means 37 which compensates for the change in operating conditions causing the temperature to rise or decrease depending upon whether the product of octane number and flow rate of the bottoms stream is above or below what the volume octane control means desires as its preset set point. As long as neither the flow rate limiting means or the octane limiting means or both of them are overriding the signal passed from the volumetric-octane control means that control is quite simple.

However, in instances in which the flow rate of the bottoms stream or the overhead stream is above the maximum values for those streams, the flow rate limiting means shall override the signal passed to the volumetric-octane control means. The reason for this is to prevent the column from being completely emptied either by an excess quantity of overhead material being passed out of the column or an excess quantity of bottoms material being passed out of the column or both. The maximum overhead and bottoms flow rates are determined generally by knowledge of the components and the quantity of feed rate material passing into the column and can be altered depending upon the feed rate into the column and do not necessarily have to be constant values. For simplification, however, we shall assume steady state feed input rates and composition and shall assume that the maximum flow rates for the overhead and bottoms streams will be constant numbers. The same may hold true for the octane limiting means, that it, its maximum and minimum octane values of the bottom stream should essentially remain constant for ease of control but may vary depending upon quantity and composition of the feed stock material passed into the column.

For purposes of simplified illustration, we shall assume that the octane number of the bottoms stream is within the permissible range of octane numbers and that the octane limiting means is not overriding the signal passing to the temperature control means 37.

When the column was producing essentially on specification octane bottoms and the bottoms flow rate is below the maximum bottoms flow rate value, the volumetric-octane control means will cause the temperature control means 37 set point to be altered up or down to maintain a constant product of bottoms flow rate times octane number. At a constant octane number of the bottoms stream should the bottoms flow stream flow rate fall off slightly, the volumetric-octane control means will cause the set point and temperature controller 37 to be slightly reduced to allow more heavy materials to be present in the bottom of a column and thereby increase the bottoms flow rate to bring the volumetric-octane control means value up to its preset value. As long as the octane number of the material now being produced is still within the permissible range of octane numbers is determined by the octane limiting means, the control is relatively simple. However, in instances in which the volumetric-octane control means has allowed the temperatures to be reduced to produce a bottoms octane number within the limits being set by the octane limiting means but the bottoms flow rate is higher than the maximum permissible value and the column presently appears to be on the verge of dumping, the flow rate limiting means 46 will step into the picture. At this instant when the bottoms flow rate exceeds the maximum flow rate permissible by the flow rate limiting means it will modify or substantially change the signal being passed from the flow rate limiting means 46 via line 53 to the volumetric-octane control means 38. In the instance in which the octane number is on specification but the bottoms flow rate is higher than the maximum value the signal passing to the volumetric-octane control means from the flow rate limiting means will be such as to cause the volumetric-octane control means to increase the set point temperature of the temperature control means 37 set point to thereby drive more materials up the column and reduce the flow rate of the bottoms material passing out of the column.

In a similar manner when the bottoms octane number and bottoms flow rate are within the specification desired for both bottoms flow rate and bottoms octane but the overhead flow rate is above the maximum overhead flow rate value, flow rate limiting means 46 will sense this and cause its signal to the volumetric-octane control means to be modified which will cause the volumetric-octane control means to decrease the set point temperature of temperature controller 37 thereby allowing more material from the overhead portion of column 4 to eventually work its way down from the top of the column in order to bring the flow rate of the overhead material back to a value below the maximum permissible overhead flow rate. When the overhead flow rate is backed down to a specification value, the flow rate limiting means 46 ceases to override the signal passing to volumetric-octane control means 38 and then allows the system to be controlled simply on the basis of the product of the bottoms flow rate signal and the bottoms octane signal.

In instances in which both the overhead and bottoms flow rate streams are below the maximum values set for each of those flow rates, but the octane is either above or below the range of values desired, the octane limiting means 51 will override the signal from the octane monitor and cause the volumetric-octane control means 38 to modify the set point temperature controller 37 to bring the octane number of the bottoms stream back to value within the preferred range. Specifically, should the octane number of the bottoms stream fall below a preset minimum bottoms octane value, the reboiler heat control means set point is adjusted in an upward direction and calls for an increase in reboiler temperatures. Obviously, an increase in reboiler temperatures also is accompanied by an increase in overhead make quantity. If the overhead flow rate is above the preset maximum value, the overhead flow relimiting means will also send a signal to the volumetric-octane control means 38 which can override the octane monitor signal. The increase in reboiler temperatures will cause more of the lighter materials to be driven up the column thereby allowing the higher octane heavier boiling materials to be present in the bottoms and increase the octane of the bottoms stream. When the octane at the bottoms streams fall back above the minimum octane number value, the octane limiting means 51 no longer functions to override the signal passing to the volumetric-octane control means 38. Similarly, should the octane number of the bottoms stream be above the maximum octane number value desired, the octane limiting means will modify signal passing to the volumetric-octane control means to cause the volumetric-octane control means to reduce the set point temperature of temperature controller 37. This will cause more of the lighter weight materials to be brought down to the column thereby reducing the octane number of the bottoms material and bringing it into the range of preferred specification values.

In the rare instances in which the bottoms flow rate is above a maximum flow rate value and the bottoms octane number is above the bottoms octane maximum value, both the octane limiting means and the flow rate limiting means will be overriding signals to the volumetric-octane control means. The octane limiting means 51 would be calling for a reduced temperature since the octane number of the bottoms material is higher than it should be and the flow rate limiting means 46 would call for increased temperatures since there is more bottoms material than is needed. In these instances, no reasonable control could be achieved since both the octane limiting means and the flow rate limiting means would be operating against each other and actual control over the column would be less than consistent. In these instances, it is desired that an overriding alarm be activated and that the volumetric-octane control means set point be altered. Preferably, the volumetric-octane control means set point could be increased while the octane limiting means maximum value could also be increased. In these instances, the increases would cause the octane limiting means to not override since the maximum value now set for the octane limiting means woud be above the value being measured presently for the bottoms octane stream, yet the bottoms flow rate limiting means may still be overriding the signal to the volumetric-octane control means. In these instances, the reboiler temperatures may be increased which would naturally increase the octane number of the bottoms stream but since its maximum value has been increased, normal operations could then take place. A similar situation would occur in instances in which the octane number of the bottoms stream is below the minimum octane number desired and the overhead flow rate was above the maximum overhead flow rate value. In each instance, there would be signals from both the flow rate limiting means and the octane limiting means which would be attempting to produce opposite results as far as the set point temperature of the temperature controller 37 is concerned. Specifically, when the overhead flow rate is above the maximum value, the reboiler temperature should be reduced to allow more material to fall to the bottom of the column while when the octane number of the bottoms stream is below the minimum octane value, the temperature and the reboiler should be increased. In these instances, as mentioned above, an alarm should be signaled and either the overhead maximum flow rate should be increased or the octane minimum value should be decreased. It is preferable. however, to decrease the overhead maximum flow rate value since, in many instances, this situation would occur where a concentrated quantity of lightweight materials have passed into the column.

A temperature control means 37, also with automatically adjustable set point, senses and controls reboiler vapor temperature as detected by a sensing means such as thermocouple 25 located in vapor outlet line 15. The resulting temperature output signal is transmitted via line 24 to adjust or reset the set point of flow controller 18.

Octane monitor 26, utilizing a stabilized cool flame generator with servo-positioned flame front, is field-installed adjacent to column 4. In a preferred embodiment, the flows of oxidizer (air) and fuel (gasoline sample) are fixed as is the induction zone temperature. Combustion pressure is the parameter which is varied in a manner to immobilize the stabilized cool flame front. Upon a change in sample octane number, the change in pressure required to immobilize the flame front provides a direct indication of the change in octane number. Typical operating conditions for the octane monitor are:

| | |
|---|---|
| Air flow | 3500 cc./min. (STP). |
| Fuel flow | 1 cc./min. |
| Induction zone temp. | 700° F. (research octane); 800° F. (motor octane). |
| Combustion pressure | 4–20 p.s.i.g. |
| Octane range (max.) | 80–102. [1] |

[1] The actual calibrated span of the octane monitor as here utilized will, in general, be considerably narrower. For example, if the target octane is 95 clear (research method), a suitable span may be 92–98 research octane. When a relatively narrow span is employed, the octane number change is essentially directly proportional to the change in combustion pressure.

FIG. 1 further illustrates an alternate embodiment wherein the temperature control means 37 senses and controls not the reboiler vapor as it emerges directly from reboiler 14, but rather the liquid or vapor temperature obtaining within the column at a point some distance above the reboiler vapor line and below the feed inlet. In this instance, a thermocouple 25' is used in lieu of thermocouple 25, the former being located several trays (for example, 2–6 trays) above vapor outlet 15. This latter arrangement will afford a more immediate detection of increasing light ends concentration, resulting for example from an over-reflux condition, at least several minutes before such light ends reach the reboiler to cause a change in the operation thereof.

Figure 2:
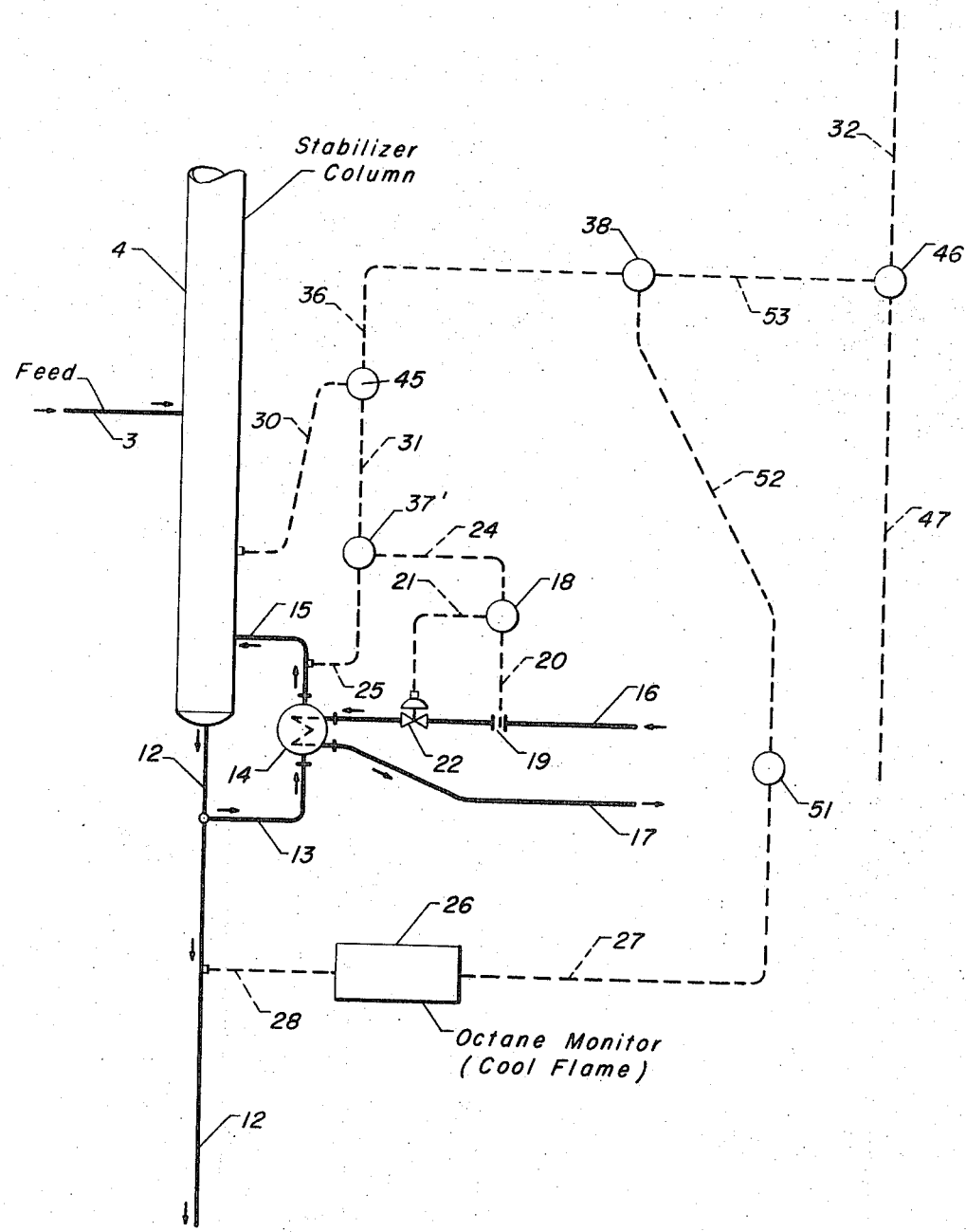
FIG. 2 is a fragmentary view of a stabilizer column with a triple cascade system for regulating heat input to maintain constant bottoms octane number.

FIG. 2 illustrates another embodiment of the invention which differs in the provision of a second temperature controller. Here a thermocouple 30, located several trays above vapor outlet line 15, provides a temperature input signal to the temperature control means 45 which has an adjustable set point. The temperature output signal from temperature control means 45 is transmitted via line 31 to reset the set point of temperature control means 37'. Control means 37' obtains its input signal from thermocouple 25 located in transfer line 15. The volumetric-octane control means 38 signal is transmitted via line 36 to reset the adjustable set point of temperature control means 45. The construction and operation of the remaining components of the control system are the same as previously described in connection with FIG. 1. The triple cascade system of FIG. 2 will be particularly advantageous when it is anticipated that the feed rate and/or feed composition to the stabilizer column will be subject to substantial variation.

Those skilled in the art will furthermore perceive that the inventive control system is not limited to the specific embodiments disclosed. For example, the stabilizer column 4 could be operated as a deethanizer, a depropanizer, a depentanizer, or a dehexanizer and still derive the operational benefits of the inventive control system. Furthermore, column 4 could be operated as a gasoline splitter column, wherein a gasoline feed fraction would be separated into low boiling and high boiling constituents for subsequent gasoline blending purposes as, for example, wherein a debutanized gasoline is split into an overhead fraction having an endpoint of 380° F. and a bottoms fraction comprising hydrocarbons boiling above 380° F. Additionally, the application of the inventive control system is not limited to the fractional distillation of reformate gasolines, much less to those having a 400° F. endpoint, and the feed to column 4 could comprise cracked gasoline, natural gasoline, alkylate gasoline, etc., wherein the gasoline feed could be stabilized or unstabilized These and other modifications in the fractionation environment should in no way be construed to impose a limitation on the broadness of application of the inventive control system.

DETAILED DESCRIPTION OF THE INVENTION

The invention of this application is a process control application of the hydrocarbon analyzer described in U.S. Pat. 3,463,613, having E. R. Fenske and J. H. McLaughlin as its inventors. All the teachings of which, both general and specific, are incorporated by reference herein.

As set forth in U.S. Pat. 3,463,613, the composition of a hydrocarbon sample can be determined by burning the sample in a combustion tube under conditions to generate therein a stabilized cool flame. The position of the flame front is automatically detected and used to develop a control signal which, in turn, is used to vary a combustion parameter, such as combustion pressure, induction zone temperature or air flow, in a manner to immobilize the flame front regardless of changes in composition of the sample. The change in such combustion parameter required to immobilize the flame following a change of sample composition is correlatable with such composition change. An appropriate read-out device connecting therewith may be calibrated in terms of the desired identifying characteristic of the hydrocarbon sample, as, for example, octane number. Such an instrument is conveniently identified as a hydrocarbon analyzer comprising a stabilized cool flame generator with a servo-positioned flame front. The type of analysis effected thereby is not a compound-by-compound analysis of the type presented by instruments such as mass spectrometers or vapor phase chromatographs. On the contrary, the analysis is represented by a continuous output signal which is responsive to and indicative of hydrocarbon composition and, more specifically, is empirically correlatable with one or more conventional identifications or specifications of petroleum products such as Reid vapor pressure, ASTM or Engler distillations or, for motor fuels, knock characteristics such as research octane number, motor octane number or composite of such octane numbers.

For the purpose of the present application, the hydrocarbon analyzer is further limited to that specific embodiment which is designed to receive a hydrocarbon sample mixture containing predominantly gasoline boiling range components, and the output signal of which analyzer provides a direct measure of octane number, i.e. research octane, motor octane or a predetermined composite of the two octane ratings. For brevity, the hydrocarbon analyzer will be referred to in the following description and accompanying drawings simply as an "octane monitor."

An octane monitor based on a stabilized cool flame generator possesses numerous advantages over conventional octane number instruments such as the CFR engine or automated knock-engine monitoring systems. Among these are: elimination of moving parts with corresponding minimal maintenance and down-time; high accuracy and reproducibility; rapid speed of response providing a continuous, real-time output; compatibility of output signal with computer or controller inputs; ability to receive and rate gasoline samples of high vapor pressure, e.g. up to as high as 500 p.s.i.g., as well as lower vapor pressure samples (5–250 p.s.i.g.). These characteristics make the octane monitor eminently suitable not only for an indicating or recording function, but particularly for a process control function wherein the octane monitor is the primary sensing element of a closed loop control system comprising 0, 1, 2 or more subloops connected in cascade.

The present invention has as its principal objective the direct control of octane number of a stabilizer or splitter column bottoms stream. A stabilizer is an externally refluxed, multiple tray, fractional distillation column employed to remove the light ends from unstabilized or wild gasoline. For example, the feed to such a column is, typically, unstabilized reformate from a catalytic naphtha hydroreforming unit. The hot vaporous reactor effluent containing hydrogen, normally gaseous hydrocarbons and gasoline boiling range hydrocarbons is condensed and passed to a separation zone which is a single stage gravity-type phase separator maintained at reforming pressure range of, say, 50–500 p.s.i.g. The liquid hydrocarbon or unstabilized reformate phase is in equilibrium therein with the gas phase containing a major proportion of hydrogen. The hydrogen is withdrawn and a portion thereof is recycled to the inlet of the catalytic reforming zone together with the naphtha charge. The liquid hydrocarbon phase from the separator is the feed to the stabilizer column. It contains a minor proportion of dissolved hydrogen and $C_1$–$C_4$ hydrocarbons which must be removed in order that the stabilized reformate will meet vapor pressure and octane number specifications. A typical sample of catalytic reformate from a separator operating at 250 p.s.i.g. consists of:

| Component: | Mole percent |
|---|---|
| $H_2$ | 2.5 |
| $C_1$ | 0.5 |
| $C_2$ | 1.5 |
| $C_3$ | 2.5 |
| $i$-$C_4$ | 2.5–3.5 |
| $n$-$C_4$ | 2.5–3.5 |
| $i$-$C_5$ | 3.5–5 |
| $n$-$C_5$ | 3.5–5 |
| $C_5$-400° F. endpoint | 81.0–76.0 |

The overhead from the column is predominantly $C_4$ and lighter hydrocarbons and the column bottoms is stabilized gasoline comprising predominantly $C_5$ to about 400° F. endpoint material. By and large, it has been the practice to operate such a column mostly "in the dark" so far as product octane number is concerned. That is to say, the column bottoms is manually sampled perhaps once every eight hour shift or perhaps even only once a day. The sample is picked up and taken to the laboratory where the sample is run and the result then transmitted back to the unit operator who, until then, has not been able to ascertain what change, if any, should have been made at the time the sample was taken. Therefore, to be on the safe side, the unit operator will usually run the column with excessive heat input and with corresponding over-reflux whereby the stabilized reformate will actually be outside of product specifications with respect to octane number a good part of the time. This mode of operation clearly increases the refiner's costs.

The control problem is further complicated by the not uncommon practice of using a single stabilizer to process more than one gasoline stream. For example, a single stabilizer column will often receive plural or combined feeds which are unstabilized reformates from two or more independently operated catalytic naphtha reforming units. An upset in the operation of a single such reformer will carry through to the stabilizer and be reflected in off-specification product so that the stabilizer bottoms product is no longer indicative of only the operation of a single reformer.

Because there is a direct measurement and control of octane rating, this control system is to be distinguished from those prior art control systems wherein some composition property, such as percent aromatics or conductivity or dielectric constant, is measured and controlled, all of these latter properties being merely an indirect indication of octane rating which is only narrowly correlatable therewith. Such indirect correlation becomes invalid for any significant deviation from the design control point.

The control system of this invention is also to be distinguished from those prior art systems employing automated knock-engines as the octane measuring device. The instant octane monitor is compact in size, can be totally enclosed by an explosion-proof housing and therefore can be used in hazardous locations. In fact, it is normally field-installed immediately adjacent the stabilizer column. A knock-engine, however, cannot be employed in hazardous locations and must therefore be situated remote from the sample point. The sample transport lag or dead time of a closed-coupled octane monitor is typically of the order of two minutes, and its 90% response time is another two minutes. This is a very good approach to an essentially instantaneous or real time output.

By way of contrast, the transport lag alone of a knock-engine may be of the order of thirty minutes or more, which those skilled in the control system art will recognize to be a substantial departure from real time output. With that much dead time built into a closed loop, it is extremely difficult to achieve and maintain stability. The injection of an outside disturbance of any appreciable magnitude, in such a potentially unstable system, will often result in undampened cycling with the consequence that the system will have to be put on manual control.

Referring to the minimum and maximum values for the bottoms octane numbers, we shall generally refer to a research clear octane number (RON). Specifically, preferred ranges of minimum to maximum octane number settings to be used in the octane limiting means include a research clear octane number of from about 92 to about 98. Of course this range can vary, and in many instances may go down to a minimum value as low as 90 or less or to a higher value such as 100 or 102 research clear octane number. Typically, the maximum and minimum values can be altered depending upon the known feed stocks which will in turn enable one to predict at optimum fractionation what the bottoms octane number will be.

The maximum overhead flow rates and the maximum bottoms flow rates to be used for the flow rate limiting means can be determined knowing the composition and flow rate of the feed stock passing into the stabilizer column. Specifically by knowing the quantity of $C_4$ and lighter materials in the feed stock passing into the stabilizer column, it is possible to predict at a given flow rate the maximum overhead flow rate which is desired in order to prevent an excess of material to be removed from the overhead of the column. In a similar manner, it is possible to determine the maximum bottoms flow rate to be used for the flow rate limiting means by knowing the composition and quantity of the fresh feed passing into the stabilizer column. Specifically, the overhead maximum value can vary anywhere from about 2 vol. percent up to about 50 vol. percent of the feed stock, depending upon the feed stocks characteristics. In a likewise manner, the bottoms maximum flow rate value can vary anywhere from about 20 vol. percent up to 98 vol. percent or higher of the feed stock passing into the column.

The set point value which can be used for the reboiler temperature can be chosen at will in order that the bottoms product produced is within a certain octane number specification and the bottoms flow rate is a reasonable value. Additionally, the volumetric-octane controlled means set point can be any number which can be determined by knowing the feed stock composition and the flow of it into the column. Of course, the maximum and minimum at set point values all recited above need not be changed in the process if no feed rates and/or feed composition changes are made during the passage of feed stocks into the stabilizer column. In fact, one of the advantages of the combination flow control and column temperature control of this process involves being able to adapt easily to changes in feed rates and compositions to the stabilizer column.

We claim as our invention:

1. In combination with a continuous flow fractional distillation column, the feed to which is a gasoline fraction, the overhead from which comprises the lower-boiling components of said fraction and the bottoms from which comprises the higher boiling components of said fraction, said column including a reboiler section having a vapor outlet connecting with a lower portion of the column and means to supply heat to said reboiler from an extraneous heat source, a control system for said column comprising:
   (a) heat control means operatively associated with said heat supply means to vary the heat input to said reboiler in response to an adjustable set point value;
   (b) a hydrocarbon analyzer means comprising a stabilized cool flame generator with a servo-positioned flame front receiving a sample of said column bottoms and developing a bottoms octane number signal;
   (c) a volumetric-octane means operatively associated with said control means to vary said adjustable set point value to maintain a generally constant product of: (1) bottoms octane number times (2) the bottoms flow rate;
   (d) means transmitting said bottoms octane signal to an octane limiting means which limiting means is operatively associated with said volumetric-octane control means and causes said volumetric-octane control means to change said set point value when said bottoms octane is below a minimum value and when said bottoms octane is above a maximum value;
   (e) flow measurement means operatively associated with said overhead and bottom streams to measure the rate of flow of said overhead and bottoms and produce overhead and bottoms flow rate signals; and
   (f) means transmitting said bottoms and overhead flow rate signals to a flow rate limiting means which means is operatively associated with said volumetric-octane control means and causes said volumetric-octane control means to change said set point value when said bottoms flow rate is greater than a maximum bottoms flow rate value and when said overhead flow rate is above a maximum overhead flow rate value.

2. The system of claim 1 wherein the feed to said column comprises unstabilized gasoline, the overhead comprises $C_4$ and lighter hydrocarbons, and the bottoms comprises stabilized gasoline containing $C_5$ and heavier hydrocarbons.

3. The system of claim 1 wherein said heat control means to vary the heat input comprises a flow control loop including a flow controller having an adjustable controller set point regulating the rate of flow of heating medium through said reboiler.

4. The system of claim 3 further characterized in the provision of means to sense the temperature in said column at a locus below the feed inlet thereto, said heat control means connecting with said temperature sensing means and developing a temperature output signal, and means transmitting the last-mentioned output signal to the flow controller to alter the flow controller set point in response control means set point value changes.

5. The system of claim 4 wherein said temperature sensing means is located in the vapor outlet from said reboiler.

6. The system of claim 4 wherein said temperature sensing means is located above said vapor outlet.

7. The system of claim 3 further characterized in the provision of a first means to sense the temperature in said column at a locus below the feed inlet thereto and above said reboiler vapor outlet, a second means to sense the temperature in said reboiler vapor outlet, said heat control means with said adjustable set point value connecting with said first sensing means and developing a first temperature output signal, a second control means with adjustable set point connecting with said second temperature sensing means and developing a second temperature output signal, means transmitting said first output signal to the set point of said second control means, means transmitting said second output signal to the set point of said flow controller, said volumetric-octane means transmitting output signals to the first temperature control means set point whereby the latter is adjusted responsive thereto.

8. The system of claim 1 wherein said adjustable set point value increases heat input to said reboiler when said set point value is increased and decreases heat input to said reboiler when said set point value is decreased.

9. The system of claim 8 wherein said adjustable set point value is increased when said bottoms octane number is below said minimum value and decreased when said bottoms octane number is above said maximum value.

10. The system of claim 9 wherein said maximum octane value is below about 100 research clear octane and said minimum octane value is above about 90 research clear octane.

11. The system of claim 8 wherein said adjustable set point value is decreased when overhead flow rate is above said maximum value.

12. The system of claim 11 wherein said adjustable set point value is increased when said bottoms flow rate is above said maximum value.

13. The system of claim 1 wherein said adjustable set point value is a selected vapor temperature desired to be maintained in said reboiler section.

14. The system of claim 13 wherein said adjustable set point value is decreased when said overhead flow rate is above said maximum value.

15. The system of claim 13 wherein said adjustable set point value is increased when said bottoms flow rate is above said maximum value.

16. The system of claim 13 wherein said adjustable set point is increased when said bottoms octane value is below said minimum octane value and decreased when said bottoms octane value is above said maximum octane value.

17. The system of claim 14 wherein said adjustable set point value is increased when said bottoms flow rate is above said maximum value.

18. The system of claim 17 wherein said adjustable set point is increased when said bottoms octane value is below said minimum octane value and decreased when said bottoms octane value is above said maximum octane value.

References Cited

UNITED STATES PATENTS

| | | | |
|---|---|---|---|
| 3,647,634 | 3/1972 | Bajek | 208—Dig. 1 |
| 3,361,646 | 1/1968 | MacMullan | 202—206 |
| 3,225,550 | 12/1965 | Kelley | 196—132 |
| 3,143,643 | 8/1964 | Fluegel | 203—2 |
| 3,649,202 | 3/1972 | Bajek | 208—Dig. 1 |
| 3,182,005 | 5/1965 | Lupfer | 202—206 |
| 2,912,365 | 11/1959 | Irvine | 202—206 |
| 3,761,358 | 9/1973 | Bajek | 196—132 |
| 3,756,921 | 9/1973 | Bajek | 196—132 |
| 3,755,087 | 8/1973 | Bajek | 196—100 |

NORMAN YUDKOFF, Primary Examiner

H. H. BERNSTEIN, Assistant Examiner

U.S. Cl. X.R.

202—160; 203—2, 3